(12) United States Patent
Bhatia

(10) Patent No.: US 6,758,887 B2
(45) Date of Patent: Jul. 6, 2004

(54) CHROMATE FREE WATERBORNE EPOXY CORROSION RESISTANT PRIMER

(75) Inventor: Promila P. Bhatia, Bristol, CT (US)

(73) Assignee: United Technologies Corporation, Hartford, CT (US)

( * ) Notice: Subject to any disclaimer, the term of this patent is extended or adjusted under 35 U.S.C. 154(b) by 0 days.

(21) Appl. No.: 10/307,156

(22) Filed: Nov. 29, 2002

(65) Prior Publication Data

US 2004/0104378 A1 Jun. 3, 2004

(51) Int. Cl.⁷ .............................. C09D 5/08; C09D 5/12
(52) U.S. Cl. .............................. 106/14.44; 106/14.41; 524/406; 524/408
(58) Field of Search ..................... 106/14.11, 14.41, 106/14.44; 524/406, 408

(56) References Cited

U.S. PATENT DOCUMENTS

| | | | | |
|---|---|---|---|---|
| 4,346,143 A | * | 8/1982 | Young, Jr. et al. | 428/332 |
| 5,059,640 A | * | 10/1991 | Hegedus et al. | 523/451 |
| 5,130,361 A | * | 7/1992 | Hegedus et al. | 524/204 |
| 5,202,367 A | * | 4/1993 | Hegedus et al. | 524/207 |
| 5,382,607 A | * | 1/1995 | Sikora et al. | 523/415 |
| 5,491,185 A | * | 2/1996 | Hegedus et al. | 523/451 |
| 5,976,415 A | * | 11/1999 | Scholl et al. | 252/389.52 |
| 6,312,812 B1 | * | 11/2001 | Hauser et al. | 428/412 |
| 6,500,544 B1 | * | 12/2002 | Tiitu et al. | 428/413 |

FOREIGN PATENT DOCUMENTS

DE          3735988 C1  *  3/1989

* cited by examiner

Primary Examiner—Anthony J. Green
(74) Attorney, Agent, or Firm—Bachman & LaPointe, P.C.

(57) ABSTRACT

A waterborne epoxy corrosion resistant primer comprises a waterborne epoxy, a curing agent, and a non-chromate containing corrosion-inhibiting pigment.

17 Claims, No Drawings

CHROMATE FREE WATERBORNE EPOXY CORROSION RESISTANT PRIMER

BACKGROUND OF THE INVENTION

The present invention relates to a corrosion resistant primer and, more particularly, a waterborne epoxy corrosion resistant primer which is free of hexavalent chromium compounds.

Structural alloys, including alloys of aluminum, steel, etc, are commonly used in aerospace, marine, auto and other applications. Generally, these alloys are protected against corrosion by applying primers or organic coatings containing corrosion inhibitors. Typically, the corrosion resistant primers used for the structural alloys are solvent based epoxy primers which employ hexavalent chromium as an active corrosion inhibitor pigment additive. These primers rely on the hexavalent chromium for corrosion protection. All forms of hexavalent chromium are recognized by the United States National Institute of Environmental Health Sciences as a Group I known human carcinogen. In addition, again with the enactment of federal and state legislation to reduce hexavalent chromium volatile organic content (VOC) levels in paints and primers, considerable attention has been given to waterborne and/or water-reducible resin binders. Accordingly, the use of corrosion inhibiting compounds which contain forms of hexavalent chromium are subject to stringent regulation and control. It would be very beneficial to eliminate hexavalent chromium as a corrosion inhibiting additive to such primers.

Accordingly, it is the principle object of the present invention to provide a corrosion resistant primer which is free of hexavalent chromium.

It is a particular object of the present invention to provide a waterborne epoxy corrosion resistant primer as set forth above which is effective in preventing attack on structural metal alloys.

It is a still further object of the present invention to provide a corrosion inhibiting waterborne epoxy primer as set forth above which is effective against both general corrosion and pitting corrosion.

Further objects and advantages of the present invention will appear hereinbelow.

SUMMARY OF THE INVENTION

In accordance with the present invention the foregoing objects and advantages are readily obtained.

The present invention is drawn to a waterborne epoxy corrosion resistant primer comprising a waterborne epoxy, a curing agent, and a non-chromate corrosion inhibiting pigment. In accordance with the present invention, the non-chromate corrosion inhibiting pigment comprises a non-chromate corrosion inhibiting pigment additive in combination with other pigment extenders and the like. The non-chromate corrosion inhibiting pigment additive is selected from the group consisting of cerous molybdate with bismuth vanadate, cerous molybdate with strontium tungstate, cerous phosphate with strontium tungstate, bismuth vanadate with bismuth molybdate and strontium tungstate, and mixtures thereof. The particularly preferred non-chromate corrosion inhibiting primer additive is cerous molybdate with strontium tungstate.

DETAILED DESCRIPTION

The present invention is drawn to a chromate free waterborne epoxy corrosion resistant primer comprising a waterborne epoxy, a curing agent, and a non-chromate corrosion inhibiting additive.

In accordance with the present invention, the non-chromate corrosion inhibiting pigment comprises (1) a non-chromate corrosion inhibiting additive selected from the group consisting of cerous molybdate with bismuth vanadate, cerous molybdate with strontium tungstate, cerous phosphate with strontium tungstate, bismuth vanadate with bismuth molybdate and strontium tungstate, and mixtures thereof, and (2) extender pigments selected from the group consisting of titanium dioxide, clay or aluminum silicate, calcium carbonate, talc or magnesium silicate, zinc oxide, and barytes or barium sulfate. The non-chromate corrosion inhibiting pigment (that is, the total pigment which includes the non-chromate corrosion-inhibiting additive and extender pigments) is present in an amount of between 25 to 60 wt. %, preferably 40 to 55 wt. %, with respect to the final primer composition. The non-chromate corrosion inhibiting additive comprises between 5 to 40 wt. %, preferably 25 to 35 wt. %, with respect to the total pigment composition.

In a preferred embodiment of the present invention, the waterborne epoxy corrosion resistant primer comprises a waterborne epoxy selected from the group consisting of waterborne non-volatile dispersion of diglycidyl ether bisphenol A modified epoxies having weight per epoxide (WPE) value between 450–700 and viscosity between 12000–19000 cps. In one embodiment of the present invention, the dispersion is based on a medium molecular weight wherein the dispersion is based on a medium molecular weight, polyfunctional resin dispersion, which on curing forms a high crosslink density polymer having very good hardness and resistance. In a further embodiment, the dispersion is based on an aqueous dispersion of a semi-solid standard bisphenol A epoxy resin of high molecular weight epoxy resin. The waterborne epoxy is present in an amount of 5 to 50 wt. %, preferably between 15 to 30 wt. % with respect to the final primer composition.

In accordance with the present invention, the curing agent is selected from the group consisting of waterborne or water-reducible modified amine or polyamidoamine adducts having amine value between 300–450. In a preferred embodiment of the present invention, the curing agent further includes a hydrophobic curing agent to impact water in corrosion resistance. The curing agent is present in an amount of between 2 to 20 wt. %, preferably 5 to 15 wt. %, with respect to the final primer composition.

The chromate free waterborne epoxy corrosion resistant primer of the present invention is particularly useful in preventing general corrosion and pitting corrosion on metal substrates, particularly, alloys of aluminum, alloys of steel, stainless steels, high strength stainless steel alloys, and the like. The use of the chromate free waterborne epoxy of the present invention is useful in all industries including the aerospace industry, automotive industry, architectural industry, packaging industry, electronics industry, HBAC and marine.

The corrosion inhibiting properties of the chromate free waterborne epoxy corrosion resistant primer of the present invention will be made clear from the following example.

EXAMPLE

Four waterborne epoxy primer compositions were prepared as shown in Table 1. Aluminum surfaces were used to evaluate the corrosion properties of these primers. The aluminum surfaces were either phosphoric acid anodized or blasted prior to application of the primers. The test coupons were exposed to salt spray tests as per ASTM B117. The coupons were then evaluated for signs of corrosion and pitting and compared to benchmark strontium chromate based epoxy primers in accordance with MIL-H-85582. The corrosion resistant properties of the waterborne epoxy primers in accordance with the present invention were evaluated with respect to the chromate containing primers. While the corrosion inhibitive properties of the four primers did not exhibit corrosion inhibitive properties comparable with the chromate containing primers, the primers did exhibit corrosion inhibitive properties without constituting a health risk.

TABLE I

Waterborne Epoxy Primers

| Primer # | % PVC | Components | Weight, gms |
|---|---|---|---|
| Primer I | 20 | Epoxy resin | 80.00 |
| | | Cerium molybdate | 48.30 |
| | | Strontium tungstate | 61.90 |
| | | Cerium nitrate | 1.00 |
| | | Propylene glycol phenyl ether | 8.00 |
| | | 4-Hydroxy-4-methyl-2-pentanone | 12.00 |
| | | DI water | 35.00 |
| Primer II | 25 | Epoxy resin | 75.00 |
| | | Cerium molybdate | 60.37 |
| | | Strontium tungstate | 77.36 |
| | | Cerium nitrate | 1.00 |
| | | Propylene glycol phenyl ether | 7.50 |
| | | 4-Hydroxy-4-methyl-2-pentanone | 15.00 |
| | | DI water | 40.00 |
| Primer III | 30 | Epoxy resin | 70.0 |
| | | Cerium molybdate | 72.45 |
| | | Strontium tungstate | 92.85 |
| | | Cerium nitrate | 1.00 |
| | | Propylene glycol phenyl ether | 7.00 |
| | | 4-Hydroxy-4-methyl-2-pentanone | 20.00 |
| | | DI water | 60.00 |
| Primer IV | 35 | Epoxy resin | 65.00 |
| | | Cerium molybdate | 84.52 |
| | | Strontium tungstate | 108.32 |
| | | Cerium nitrate | 1.00 |
| | | Propylene glycol phenyl ether | 6.50 |
| | | 4-Hydroxy-4-methyl-2-pentanone | 25.0 |
| | | DI water | 70.0 |

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. A waterborne epoxy corrosion resistant primer composition comprising:
    a waterborne epoxy;
    a curing agent; and
    a non-chromate containing corrosion inhibiting pigment, wherein the non-chromate corrosion inhibiting pigment comprises a non-chromate corrosion inhibiting pigment additive selected from the group consisting of (1) cerous molybdate with bismuth vanadate, (2) cerous molybdate with strontium tungstate, (3) cerous phosphate with strontium tungstate, (4) bismuth vanadate with bismuth molybdate and strontium tungstate, and mixtures thereof; and extender pigments.

2. A primer according to claim 1 wherein said waterborne epoxy is selected from the group consisting of waterborne non-volatile dispersion of diglycidyl ether bisphenol A modified epoxies having weight per epoxide (WPE) value between 450–700 and viscosity between 12000–19000 cps.

3. A primer according to claim 2 wherein the dispersion is based on a polyfunctional resin dispersion, which on curing forms a high crosslink density polymer having very good hardness and resistance.

4. A primer according to claim 2 wherein the dispersion is based on an aqueous dispersion of a semi-solid standard bisphenol A epoxy resin.

5. A primer according to claim 2 wherein said waterborne epoxy is present in an amount of between 5 to 50 wt. % with respect to the primer composition.

6. A primer according to claim 2 wherein said waterborne epoxy is present in an amount of between 15 to 30 wt. % with respect to the primer composition.

7. A primer according to claim 1 wherein the curing agent is selected from the group consisting of waterborne or water-reducible modified amine or polyamidoamine adducts having amine value between 300–450.

8. A primer according to claim 7 wherein the curing agent further includes a hydrophobic curing agent for enhanced water and corrosion resistance.

9. A primer according to claim 7 wherein said curing agent is present in an amount of between 2 to 20 wt. % with respect to the primer composition.

10. A primer according to claim 7 wherein said curing agent is present in an amount of between 5 to 15 wt. % with respect to the primer composition.

11. A primer according to claim 1 wherein the non-chromate corrosion inhibiting pigment additive is cerous molybdate with strontium tungstate.

12. A primer according to claim 1 wherein the non-chromate corrosion inhibiting pigment additive is present in an amount of between 15 to 40 wt. % with respect to the non-chromate containing corrosion inhibiting pigment.

13. A primer according to claim 1 wherein the non-chromate corrosion inhibiting pigment additive is present in an amount of between 25 to 30 wt. % with respect to the non-chromate containing corrosion inhibiting pigment.

14. A primer according to claim 1 wherein the non-chromate corrosion inhibiting pigment is present in an amount of between 25 to 60 wt. % with respect to the final primer composition.

15. A primer according to claim 1 wherein the non-chromate corrosion inhibiting pigment is present in an amount of between 40 to 55 wt. % with respect to the primer composition.

16. A primer according to claim 12 wherein the non-chromate corrosion inhibiting pigment is present in an amount of between 25 to 60 wt. % with respect to the primer composition.

17. A primer according to claim 13 wherein the non-chromate corrosion inhibiting pigment is present in an amount of between 40 to 55 wt. % with respect to the primer composition.

* * * * *

UNITED STATES PATENT AND TRADEMARK OFFICE
CERTIFICATE OF CORRECTION

PATENT NO. : 6,758,887 B2
DATED : July 6, 2004
INVENTOR(S) : Promila P. Bhatia

It is certified that error appears in the above-identified patent and that said Letters Patent is hereby corrected as shown below:

<u>Column 4,</u>
Line 3, the word "final" should be deleted.

Signed and Sealed this

Fourth Day of October, 2005

JON W. DUDAS
*Director of the United States Patent and Trademark Office*